July 23, 1935.  H. CORY  2,008,898
STAND FOR COFFEE FUNNELS
Filed Sept. 5, 1933
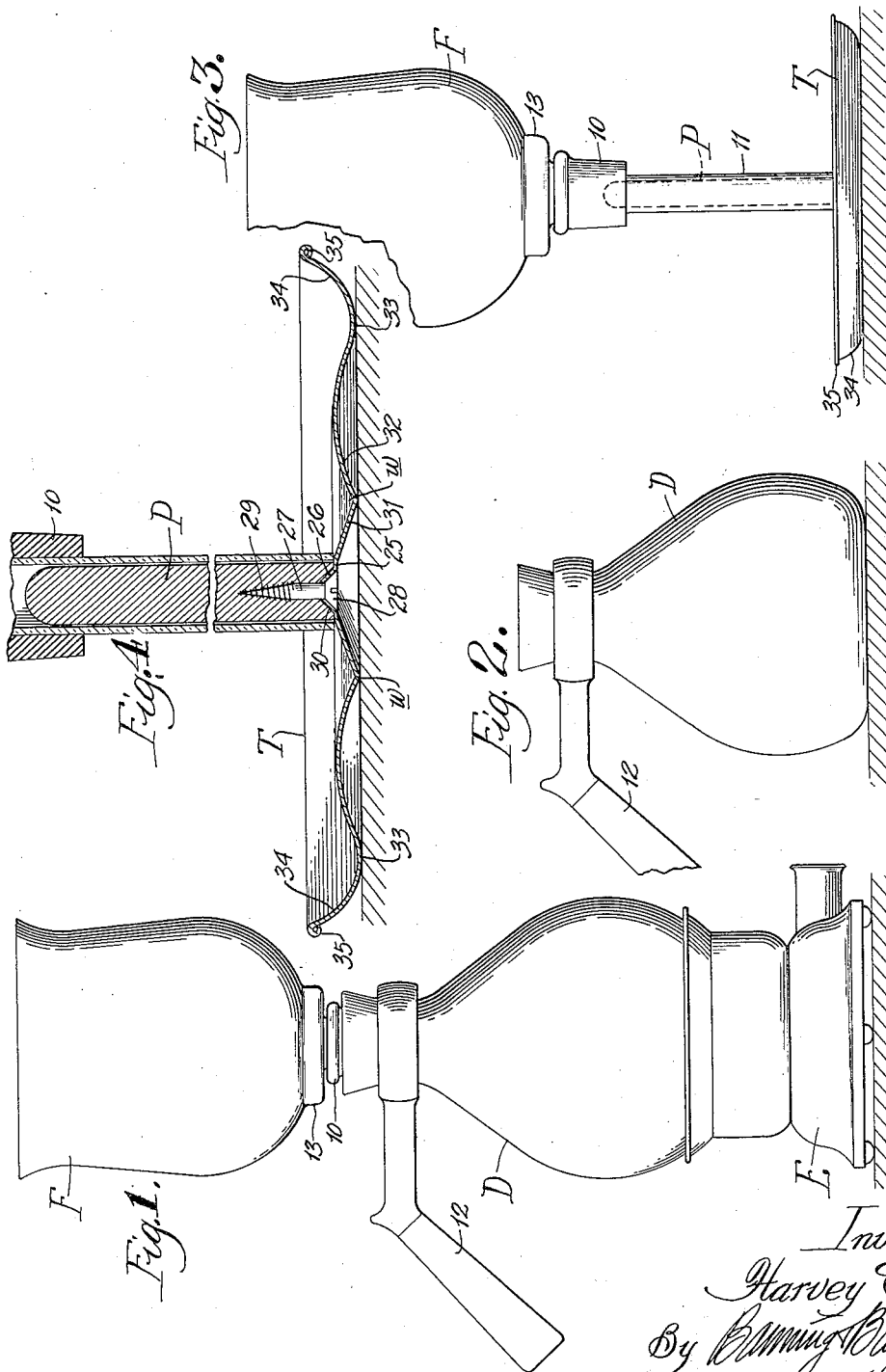
Inventor:
Harvey Cory,
By Banning & Banning
Attys.

Patented July 23, 1935

2,008,898

REISSUED

UNITED STATES PATENT OFFICE 2,008,898

STAND FOR COFFEE FUNNELS

Harvey Cory, Chicago, Ill.

Application September 5, 1933, Serial No. 688,130

2 Claims. (Cl. 65—65)

This invention relates to a stand for the funnel element of a vacuum coffee maker. Such a utensil includes two vessels, one a decanter and the other a funnel, the latter having a tubular stem depending into the decanter for sealed connection therewith. More particularly, the present improvements are directed to means for supporting the funnel when disconnected from the decanter, the object being to provide a support for holding in upright position the funnel element when removed from the decanter, and to accomplish this by means which is simple, adequate in the support furnished, light so as to be economical, and effective in the concentration of liquid which may drain thereupon.

These and other objects of my invention are realized by the construction which is herein shown and described in the accompanying drawing wherein—

Fig. 1 is a view in elevation of a vacuum brewer with funnel in sealed connection with its supporting decanter;

Fig. 2 which is a similar view shows the decanter disconnected from the funnel and removed from the heater;

Fig. 3 is a view in elevation of the funnel in upright position supported upon the holder therefor; and Fig. 4 is an enlarged vertical sectional view of the funnel holder showing the funnel stem in operative relation therewith.

The coffee brewer illustrated, which is of the vacuum type, comprises a decanter D adapted to be rested upon or over a heater E. Fitted within the neck of the decanter is a bushing 10 through which is extended a tubular stem 11 depending from a funnel F. A handle 12 may be connected to the neck of the decanter, as is usual. A strainer (not shown) is also interposed between the funnel and decanter in accordance with usual practice.

Upon completion of the brewing operation, it is customary to remove both vessels from off the heater and to separate one vessel from the other. This involves no problem in the case of the decanter D which is formed to stand upon its own bottom, as shown in Fig. 2. In the case of the funnel F, however, some practical difficulties arise, particularly if the funnel is to be stood upright in proper position for draining. To meet these conditions, I have devised an improved funnel holder the details of which will now be explained.

Referring to Figs. 3 and 4, the funnel holder comprises a base in the form of a circular tray T from which upstands centrally a post P, whose upper end is desirably rounded off, as shown. The base may be formed of a thin aluminum sheet in circular form having a transverse profile desirably as shown in Fig. 4. Here it will be noted I provide in the center of the tray an elevated platform 25 upon which rises a conical boss 26 having a central opening for the reception of the shank of a screw 27. The head 28 of the screw is shown as provided with beveled sides conforming to the conical walls of the boss so as to fit therewithin. Threads 29 extend along the shank to the pointed end of the screw and when engaged within an axial opening in the post will cooperate therewith to hold the post tightly upon the platform. The lower end of the post is provided with a flaring recess 30 for the accommodation of the conical boss. Due to the fit of the screw head against the inner face of the boss, the fit of the socketed post end against the outer face of the boss, the bearing of the post end against the platform, and the connection between the screw and post which draws the latter tightly down upon the platform whereon it is mounted, the post is secured in a steady and fixed position upon its base.

Extending around the platform in adjacent relation to the central elevated platform is an annular depression $w$ forming a well for the accommodation of liquid which may drain down through or along the funnel stem. This well is formed by inner and outer walls 31 and 32 which descend and rise respectively, the latter descending once more to provide a bearing point 33, and finally rising at 34 to form for the base a marginal edge having a bead or roll 35. The bearing point cooperates with the bottom of the well so as to lie in the same plane therewith. Accordingly a base so formed may rest upon a plane surface with contact established at these two places only, viz., the well and bearing point both of which extend circularly in the form of rings upon the under surface of the base.

Upon a holder so constructed the funnel may be supported in upright position, as shown in Figs. 3 and 4. The tubular stem is fitted down over the post until the bottom end of the stem is rested upon the central platform of the base. When so disposed liquid is free to drain down inside or outside the stem to collect in the well where it is confined against spreading. The base while light and thin is nevertheless amply strong and wide to furnish lateral support for the post due (1) to the radial bracing afforded by the arched or angled contour of the base, and (2) to the provision of an annular bearing point remote from the base center but coincident with the plane of the well. A funnel holder so constructed is capable of meeting the everyday requirements of use over a prolonged period.

I claim:

1. A holder for a vacuum coffee brewer funnel comprising a circular base of light thin metal raised in its center to provide an elevated platform from which rises a conical boss, the base having an annular depression adjacent the platform furnishing a well for the collection of drained liquid, the base being extended laterally beyond the well to furnish an annular bearing point which lies in a plane coincident with the bottom of the well, whereby the base, when rested upon a plane surface, will establish contact therewith at two annular portions only, a post over which the funnel stem may be fitted, having its lower end formed with a conical socket adapted for fitting over the conical boss of the platform so as to derive support therefrom, and a screw having a beveled head fitting against the inner face of the conical boss, the screw shank passing through the boss for threaded connection with the post and adapted, when tightened, to draw the post into firm engagement with the base, the cooperating beveled walls of the screw head and boss serving to center the screw axially with respect to the base, the cooperating beveled socket and conical walls of the boss cooperating to center the post axially with respect to the base, and the end wall of the post cooperating with the platform of the base to maintain the post in upright position thereupon.

2. A holder for a vacuum coffee brewer funnel comprising a post over which the funnel stem may be fitted, and a base whereon the post is vertically supported comprising a plate having a central elevated platform furnishing a rest for the bottom end of the post, means passing through the platform into the post to connect the one immovably to the other, and an annular depression in the base adjacent the platform forming a well for the collection of liquid draining from the funnel.

HARVEY CORY.